United States Patent [19]
Exertier

[11] Patent Number: 5,832,498
[45] Date of Patent: Nov. 3, 1998

[54] DEVICE FOR GENERATING OBJECT-ORIENTED INTERFACES FOR RELATIONAL DATA BASES AND A PROCESS IMPLEMENTED BY THIS DEVICE

[75] Inventor: François Exertier, St. Vincent de Mercuze, France

[73] Assignee: Bull, S.A., Louveciennes, France

[21] Appl. No.: 527,632

[22] Filed: Sep. 13, 1995

[30] Foreign Application Priority Data

Sep. 13, 1994 [FR] France .................................. 94 10912

[51] Int. Cl.[6] .................................................. G06F 17/30
[52] U.S. Cl. ............................... 707/103; 707/102; 707/1
[58] Field of Search ..................... 365/612, 613, 365/614; 707/103, 102, 1

[56] References Cited

U.S. PATENT DOCUMENTS

| | | | |
|---|---|---|---|
| 5,542,078 | 7/1996 | Martel et al. | 395/612 |
| 5,548,749 | 8/1996 | Kroenke et al. | 395/613 |
| 5,566,333 | 10/1996 | Olson et al. | 395/613 |
| 5,596,746 | 1/1997 | Shen et al. | 395/612 |
| 5,615,362 | 3/1997 | Jensen et al. | 395/614 |
| 5,652,882 | 7/1997 | Doktor | 707/201 |

OTHER PUBLICATIONS

Proceedings of the 32nd Annual Southeast Conference, Proceedings of Sec '94. 32nd Annual ACM Southeast Conference, Tuscaloosa, AL, USA, 17–18 Mar. 1994, ISBN 0–89791–637–9, 1994, New York, NY, USA, ACM, USA, pp. 162–165, Ramanathan C "Providing Object–Oriented Access to a Relational Database" *p. 163, col. 2, line 36–p. 165, col. 1, line 30; figure 3*.

USENIX C++ Technical Conference Proceedings, Portland, OR, USA, 10–13 Aug. 1992, 1992, Berkeley, CA, USA, USENIX Assoc, USA, pp. 151–169, Alashqure A et al. "O–R Gateway: A System for Connecting C++ Application Programs and Relational Databases" * p. 152, line 4–p. 162, line 1.

Interoperable Database System (DS–5) IFIP WG2.6 Database Semantics Conference, Lorne, VIC., Australia, 16–20 Nov. 1992, vol. A–25, ISSN 0926–5473, IFIP Transactions A (Computer Science and Technology), 1993, Netherlands, pp. 69–85, Ling–Ling Yan et al "Translating Relational Schema with Constraints Into OODB Schema" *entire document.

Computer Standard and Interfaces, vol. 13, No. 1 /03, 1 Jan. 1991 pp. 221–230, CP 000288495, Beech D et al "Object Databases as Generalizations of Relational Databases" *entire document*.

*Primary Examiner*—Wayne Amsbury
*Attorney, Agent, or Firm*—Kerkam, Stowell, Kondracki & Clarke, P. C.; Edward J. Kondracki

[57] ABSTRACT

A device and process for generating object-oriented interfaces (GEN) for authorizing new applications (OOA) developed in object-oriented environments to access existing relational data bases (RDB). The device (GEN) creates, according to a process for generating object-oriented interfaces from the schema of the relational data base, an object schema which constitutes an object-oriented view of the existing relational data base (RDB), this view, which constitutes the object-oriented interface (OOI), being composed of a set of classes which represent the entities stored in the data base. The input applied to the interface generation device is the data base description (DBD) in a standard language for defining and manipulating data.

9 Claims, 2 Drawing Sheets

DEVICE FOR GENERATING OBJECT-ORIENTED INTERFACES FOR RELATIONAL DATA BASES AND A PROCESS IMPLEMENTED BY THIS DEVICE

BACKGROUND OF THE INVENTION

The present invention relates to a device for generating object-oriented interfaces for enabling new applications developed in object-oriented environments to access existing relational data bases. It also relates to a process implemented by this device.

Generally, in order to simplify the representation of data, and to enable higher productivity on the part of developers and users, the relational data model is currently used because it allows the tabular representation of objects as well as of the associations between objects. In this case, a relational data base is like a set of relations, hence the name of the model; these relations are also called tables. A conceptual schema associated with a data base describes its structure arid the type of data it contains and possibly, as in the case of the present invention, the constraints or rules which must always be verified. The data base itself is managed by a data base management system. Each relation also has a schema which describes its structure and an extension which corresponds to the state of this relation at a given instant. The schema of a table is composed of a set of attributes (or columns), a sub-assembly of which constitutes the key which enables identification of the other attributes of the relation or an element (n-triple) of the relation. The extension of a relation is constituted by a set of n-triples (or rows). An n-triple corresponds to a set of values which are assumed by the attributes of a table in order to represent an object or a link between objects in the real world. Two relations which share attributes in the same domain can be joined, in which case they are called joining relations, this joining being executed on one or more of these attributes, which are called joining attributes. Thus, it is possible to join two tables, which allows a matching between these two tables by comparing the values of the columns in the tables, the columns used for the comparison being called joining columns. The result of this joining is a third table whose columns are derived from the two tables and whose rows are those from the two tables which verify the comparison criterion. With this in mind, the utilization of a standard language for defining and manipulating data such as, for example, the language SQL (Structured Query Language), would appear to be very advantageous for the definition and manipulation of relational data bases. The model also makes it possible to provide supplementary semantic information on the attributes of the relations by imposing referential integrity constraints. Thus, in terms of keys, an attribute defined as a primary key makes it possible, in a unique way, to determine the n-triple of which it is a part, since a given value for this attribute cannot be found in two different n-triples. Likewise, an attribute defined as a foreign key makes it possible to reference, i.e., label, the primary key of another table. It is then possible to define a link between these two tables through the foreign key attribute and the labelled primary key.

In addition to the simplicity and the improvement in performance due to the utilization of the relational data model, the standardization of such an easy-to-use language as the language SQL has contributed to the proliferation of relational data bases. Thus, up to now, most of the applications developed, at least over the last decade, are applications designed to be used by relational data base management systems. The current trend, however, is to move toward designing applications which use object-oriented technologies. Still, these two techniques must be able to cooperate and existing relational data bases must continue to be usable in the various systems, which poses the problem of access by the applications developed in object-oriented environments to these relational data bases. Consequently, it is essential and urgent to find a rational and effective solution to this access problem.

In order to solve this problem, several solutions have been proposed, including the two which follow.

The first solution (called "embedded SQL" by one skilled in the art) involves including SQL requests in the object program, which is possible when a relational data base management system is used in conjunction with standard programming language, in which case the correspondence of the data types is established by the programmer. But the drawback of this solution is that it is very cumbersome for the application programmer to use and not very practicable because it presumes a thorough knowledge of the SQL language, the relational model, the schema of the data base and specific mechanisms of the data base management system such as, for example, cursor handling and data conversion. In addition to writing the correspondence of the data types, the programmer must also take care of the correspondence between the entities in the relational data base and the objects in the object application.

The second solution involves creating generic classes which allow relational concepts to be represented in the object world (a "table" class, an "n-triple" class, etc.); these classes make it possible to facilitate the manipulation of relational data. This solution also has the principle drawback of being cumbersome to use and, here again, the programmer must have a thorough knowledge of the relational model and the schema of the data base; he is spared only such aspects as the management of the correspondence of the data types or the cursors. The implementation of this solution involves furnishing the programmer with a library of generic classes which serves as an interface for the relational data base management system; the programmer must, however, still handle the correspondence between the entities in the relational data base and the objects in the object application. Such a solution is described by Doug Wright in "Designing a relational database interface in C++," Object Magazine, Vol. 4 (No. 2), pages 55 and 56, May 1994. SUMMARY OF THE INVENTION A primary object of the present invention is to eliminate the various drawbacks presented by the known solutions and to provide a device for generating object-oriented interfaces whose design is such that relational data can be manipulated easily and transparently by the object programmer.

To this end, the instant device for generating object-oriented interfaces creates, in accordance with a process for generating object-oriented interfaces from the schema of the relational data base, an object schema which constitutes an object-oriented view of the existing relational data base, this view, which constitutes the object-oriented interface, being composed of a set of classes which represents the entities stored in the data base, the input applied to the interface generating device being a data base description in a standard language for defining and manipulating data.

For a clearer understanding by means of an analogy, knowing that an object view is comparable to a relational view and without assuming that the latter is being utilized, it is appropriate to remember that the concept of a view, which is known in the relational domain, was introduced in order to allow a user to manipulate the data other than through the tables defined in the base. A view, then, is a particular perception of the data in one or more tables, and it is stored in the form of a selection request in the data dictionary. Actually, a view is a virtual table, that is a collection which does not physically exist; it is an object whose definition is derived from the definitions of tables and/or other views and which can be considered to be the evaluation of a request from the base. Thus, the solution provided by the invention involves offering the programmer an object-oriented view of the data base to be accessed, and the classes furnished are representative of the entities in the data base which are specific to the application, for example "people" instead of "tables" or "n-triples" unlike the above-mentioned second solution, which consists of furnishing generic classes. This means that the programmer is offered an interface for access to the data base management system, an interface which is specific to the application and therefore to the data base to be accessed, such an interface being constructed for each data base. For this purpose, a generation device, also called a generator, must be used to produce the interfaces for the relational data base, which generation device receives a data base description as input. In other words, the generation device makes it possible to generate, from the relational schema or from a description of the highest level, an object-oriented interface for access to the data of this schema, the view which constitutes the interface being composed of a set of classes which represents the logical entities of the schema of data and which implements the access to this data. Thus, in accordance with the invention, it is not necessary for the programmer to have knowledge of relational concepts, just a knowledge of the entities specific to the application which are stored in the data base.

Furthermore, the instant device for generating object-oriented interfaces creates a generic class called a collection class for managing objects in memory and handling sets of objects, which makes it possible to scan a set of instances of a class or the instances which correspond to certain selection criteria; this collection class, in order to allow rapid access to the data, encapsulates mechanisms of the relational data base management system, such as the cursors, in such a way that the data which relate to the objects in memory are managed by the data base management system itself.

In effect, a request can generally return a set of rows, the number of which is unknown prior to the execution. In order to solve this problem, relational systems propose the use of a work area called a cursor which makes it possible to select (i.e., to attribute values to the host variables), one by one, the rows which verify a given condition. This cursor corresponds to a storage area whose size is determined dynamically during the execution of the program, and it contains all of the rows selected, thus making it possible to select a set of rows even without prior knowledge of the number of rows selected. A curser is associated with a request in the same program, and there can be as many cursors as there are requests, but all these cursors must have distinct names. Thus, according to the instant invention, rather than retrieving several objects and creating them all at the same time, a generic class called a collection is created, which makes it possible to encapsulate the cursors of the relational data base management system. The objects are then created in succession as the collection is navigated, although they are all locked in the relational data base even if they are not created in object memory. The encapsulation of these standard mechanisms for access to the relational data base makes it possible, quite advantageously, to maintain performance levels which are equivalent to those of a standard application written in a standard language which uses the inclusion of SQL requests ("embedded SQL," mentioned above). In effect, to reconstruct such mechanisms in the object world would result in quite a significant reduction in the performance levels obtained. Furthermore, the encapsulation of these mechanisms makes it possible to avoid having to manage the data in memory, which has already been accomplished by these encapsulated mechanisms.

Preferably, the collection class created includes two private attributes as well as two public methods, a method for creating class instances which is only used occasionally, and a method for navigating the collection which makes it possible to retrieve the objects of the collection one by one; the method for creating class instances has, as its input parameter, a request, in a standard language for defining and manipulating data., which the user wishes to initiate, and it executes this request and retrieves the identifier of the cursor containing the n-triples which meet the criteria of the request, whereas if, in fact, it is desirable to create the objects which correspond to the request, the method for navigating the collection is initiated for the collection retrieved, in which case the objects are created one by one.

It must be clearly stated here that, according to the invention, the method for creating class instances is obviously used only in exceptional cases (see the example described below).

Also, characteristically, the instant device for generating object-oriented interfaces, in order to authorize the management of transactions, includes a class called a data base administrator which implements four methods for executing, respectively, the functions of validating a transaction, cancelling a transaction, connecting to the relational data base management system, and finally disconnecting from the relational data base management system. The instant device further creates, for each class which represents a relational table, a table which contains on one hand the identifiers of the objects present in memory, an identifier of an object being a primary key which identifies the corresponding object in the relational world, and on the other hand the addresses of these objects, these tables being updated by the methods used to create or delete an object, while for each class, a table class specific to the name of the class is generated in order to implement these methods which execute the functions of memory management and which contain the description of the table which lists the objects present in memory, such management thus allowing the same relational entity to be loaded into the object program only once.

When it comes to manipulating data, generally in order for an application to be able to access the relational data stored in the relational data base, it is necessary to produce temporary copies of relational data in the object world. These copies relate only to the n-triples which participate in the processing of the object application. The loading of the data passes through a phase for accessing these data in the relational data base in order to retrieve the n-triples which meet the criteria of a request, then a phase for managing concurrent access to the resource, and finally a phase for translating the retrieved n-triples into object data. The management of concurrent access in the relational world is accomplished by means of a data lock, which is implicit and is carried out according to the type of processing. Each data reading order causes the placement of a shared lock on the data sought and each update order causes the placement of an exclusive lock on the data. However, it is possible to enforce the placement of an exclusive lock during a reading, which is what is done in order to load data in the object world, and which makes it possible to assure that the data are not obsolete at the end of the object processing, seeing that is no longer possible to modify them in the relational environment during this time. More particularly, as far as the management of transactions is concerned, it is necessary to be able to free up the resources used during a transaction and to trigger the update on a disk. In order to manage the resources in the object application, methods for managing the relational data base are used on one hand, and methods for managing the object memory are used on the other hand. Thus, according to the instant invention, it is necessary to allow the object application to use certain data management functions. To this end, and in order to allow the management of the relational data base, on one hand a data base administrator class is created which uses four methods to execute the following functions:

- a transaction validation function which, among other things, must update the relational data base, free up the resources and clear the memory of the objects used during the processing,
- a transaction cancellation function which makes, it possible to undo all the updates executed since the last validation, and which also clears the object memory,
- a function for connecting to the relational data base management system, which also requires the connection word and the user's password in order to be executed, the opening of the relational data base being implicit,
- a function for disconnecting from the relational data base management system, the closing of the relational data base also being implicit.

On the other hand, methods for managing the object memory are also used. In effect, it must be possible to clear the memory space used by the objects after each transaction, since once the transaction is terminated in the relational environment, the locks are released, and the data in object memory are no longer valid. For this purpose, it is necessary to create supplementary classes in which the data which are usable for this re-initialization, as well as the methods for managing the work area, will be stored. The objects which are already present in memory must be known in order to avoid duplicating them with each access, making it possible to preserve the consistency in the memory, and also in the relational data base. In order to manage this consistency effectively, the invention creates, for each class which represents a relational table, a table which contains the identifiers (keys of the corresponding n-uplets) of the objects present in memory on one hand, and the addresses of these objects on the other hand, these tables being updated by the methods used to create or delete an object. It is also necessary to determine the lifetime of these tables, that is, to know when to create them and when to destroy them. It is possible, at the start of the application, to statically create one table per class, but the main drawback of this solution is that it results in excessive memory consumption. A dynamic solution is clearly preferable, in which each class contains a static variable which indicates whether the table has or has not been created. This solution makes it possible to limit the number of tables in memory to the number of classes used for a given transaction. For each class, a table class specific to the name of the class will be generated in which the memory management functions, as well as the description of the table which lists the objects present in memory, will be implemented. Characteristically, different management methods are necessary for this purpose. A first method which makes it possible to know if the object which corresponds in parameter to the past key is already present in memory; if it is, it is unnecessary in this case to recreate it; it is simply necessary to retrieve its address. A second method makes it possible to list this object as being present in memory. Lastly, a third method makes it possible, in case of the destruction of this object, to delete it from the list of the objects present in memory. Thus, with the language C++, in order to retrieve the instance of the table class which is specific to the name of the class C on which it depends, this class C contains a pointer to this table class instance, a pointer which is declared as a static variable. In addition, each of these table classes is a class inherited from a principal table class, making it possible to store the addresses of the table class instances in an object table, and to then navigate this table in order to initiate, for each table class instance, a call of the method for clearing the object memory which relates to the objects which are instances of this class, in such a way as to de-allocate the memory when a transaction validation or transaction cancellation function is implemented. The method for clearing the object memory, defined in a table class, navigates this table in order to destroy all the objects labelled without, of course, destroying the corresponding relational data. This clearing method is not implemented at the level of the principal table class since it is defined in an abstract way, during the navigation of the table; it is the method for clearing the object memory which is specific to a table class which is activated.

In an important way, the process for generating object-oriented interfaces implemented by the interface generation device according to the invention makes it possible, by passing through different phases, to create the object schema from the relational schema by systematically translating the relational tables into classes on one hand, and by translating the relational links between these tables expressed by means of foreign keys, into links between objects represented by methods on the other hand, which for this purpose, in a first phase for lexical and syntactic analysis, generates the syntactic tree which describes the relational schema in the standard language for defining and manipulating data, then in a second phase navigates the tree a first time in order to mark all the joining tables, that is the tables which have only foreign keys for attributes, then in a third phase navigates the tree a second time in order to generate a class for each table which is not a joining table, while for each foreign key of such a table, methods for linkage management are generated, and for each joining table which relates to this table, the linkage methods which correspond to the class of this table are also generated.

Thus, according to this process, in the first phase for lexical and syntactic analysis, the interface generation device will construct, from the data base description in the standard language for defining and manipulating data which is applied to its input, the syntactic tree which is the description of the conceptual schema, this tree representing the written expression in the language for defining and manipulating data, for example SQL. Once the tree has been constructed in this way, it is navigated twice by means of standard navigation algorithms. In a first navigation for retrieving the joining tables, seeing that the joining tables are the tables which have only foreign keys as attributes, these tables are not translated into classes but will be used subsequently to generate linkage methods for the entities generated. Then the tree is navigated a second time in order to retrieve the other tables which are not joining tables and to generate a class for each of these tables; thus one class corresponds to each table. In addition to the linkage methods generated from the joining tables which correspond to a determined class, a linkage method is also generated for each foreign key of a table which is not a joining table. It may be added, however, that in the case of the tables which are not joining tables but which include more than one foreign key attribute, a class is generated at the same time as the linkage methods are generated for the classes labelled.

THE DESCRIPTION OF THE DRAWINGS

The following description with references to the appended drawings, given as a non-limiting example, will provide a further understanding of how the invention may be embodied, in which.

DETAILED DESCRIPION OF THE PREFERRED EMBODIMENTS

Figure 1:
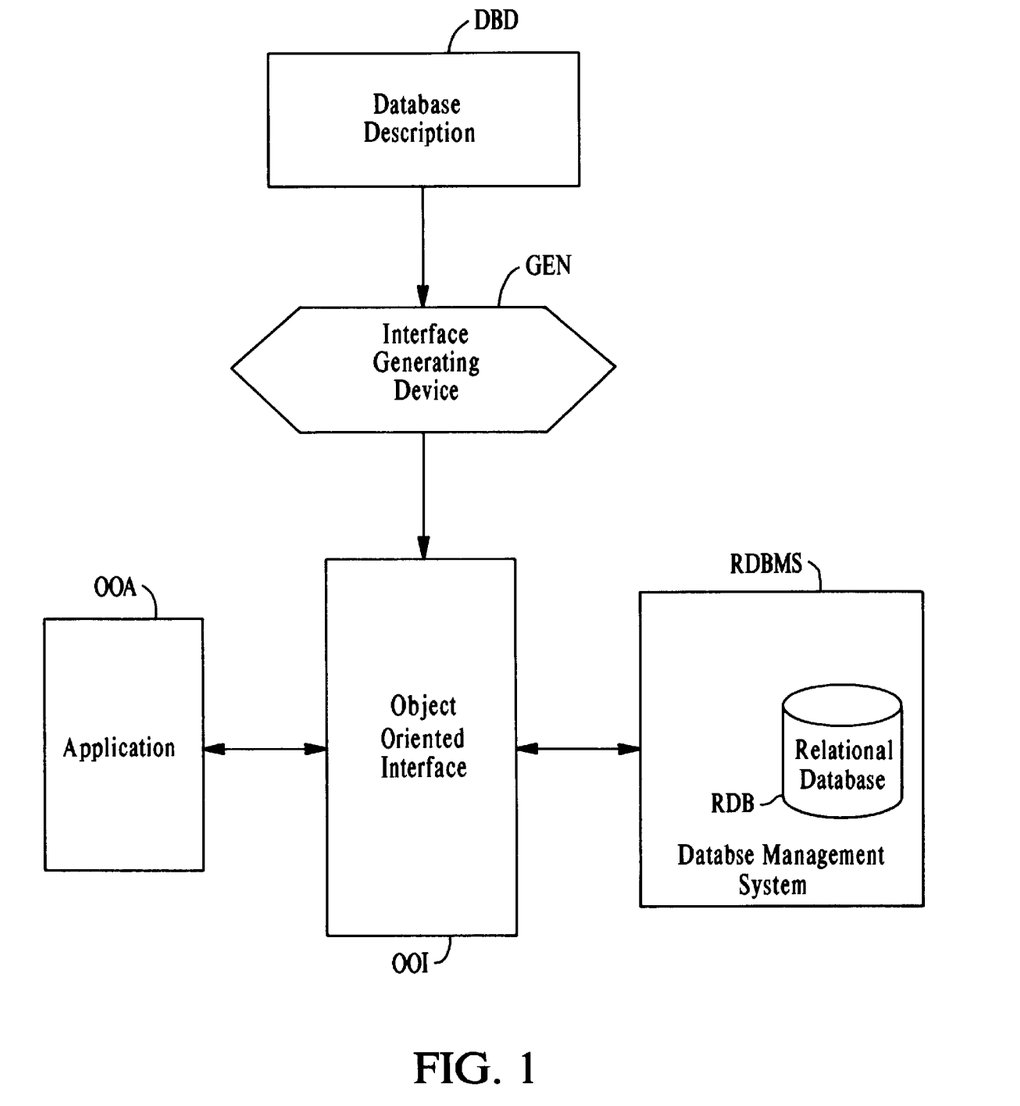
FIG. 1 schematically shows the environment of the instant device for generating object-oriented interfaces.

FIG. 1 to set forth the general principles of the instant device for generating object-oriented interfaces GEN designed to authorize access by new applications OOA developed in object-oriented environments to existing relational data bases RDB managed by one or more relational data base management systems RDBMS. Characteristically, the interface generation device GEN creates, in accordance with a process for generating object-oriented interfaces from the schema of the relational data base RDB, an object schema which constitutes an object-oriented view of the existing relational data base RDB, this view, which constitutes the object-oriented interface OOI, is made up of a set of classes which represent the entities stored in the data base. This set of classes actually constitutes the interface for access to the management system RDBMS used by the application OOA. The interface OOI thus offers a set of functions for manipulating and accessing data, such as the manipulation of a collection of objects, the creation, deletion or updating of an object, simple access to a datum, and access to a datum or navigation by means of a relational link. The interface OOI also authorizes the management of transactions using known mechanisms which are specific to relational data base management systems. A description of the data base RDB in a standard language for defining and manipulating data, for example the language SQL, is applied to the input of the interface generation device GEN, the definitions of the tables of the data base being scanned with the aid of this language. In accordance with the process according to the invention, the object schema is created from the relational schema by systematically applying the following translation rules. Each relational table is translated into a class and each relational link between the tables expressed by means of foreign keys is translated into a link between objects represented by methods, particularly methods for link creation, link destruction, and link navigation. Consequently, the joining tables used to express the relational links are not translated into classes. Generally, different types of relational links can be represented in a relational schema; they can have different cardinalities (1-1, 1-n, n,m) or associated properties, which cardinality depends on the uniqueness constraints declared in the foreign keys (the foreign key attribute being able to be defined as "unique", to be a primary key, etc.).

Thus, according to the invention, an object language such as an object SQL is not used; access to the data is advantageously accomplished by methods in the classes generated. It must be noted that the interface generation device will not transform the relational base into an object base. In fact, the relational data are successively translated into objects as the user application proceeds: When this application requests a datum, this datum is translated into an object, and only the data which participate in the processing are translated. Moreover, in order to assure consistency between the relational world and the object world, the data are locked in the relational world as soon as they are used by the application. It is also necessary to verify non-duplication of the relational data in the object world in order to assure, here again, consistency between these two worlds. In this way, when it is desirable according to the application to access a datum before translating it into an object, it is verified that it has not already been translated.

Figure 2:
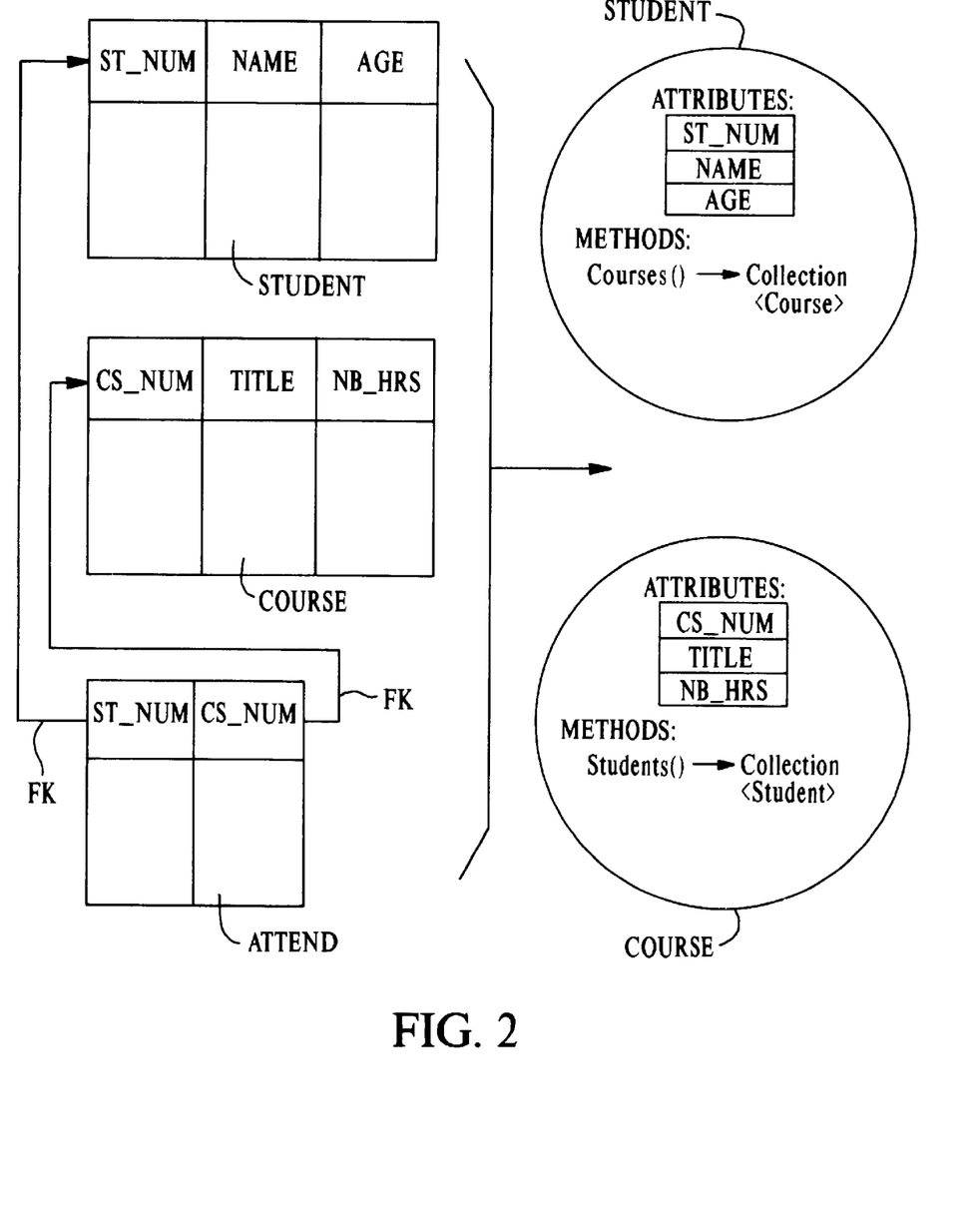
FIG. 2 provides an example applied to the generation of classes from a relational schema.

FIG. 2 illustrate a simply applied example of the generation of classes from a relational schema, and in particular shows how the standard relational tables are translated into classes, as well as how the joining tables are translated into methods which represent the relational links. Three relational tables are represented in the figure, and they allow a listing of students, of courses offered to the students and of the students' attendance of these classes. A first table STUDENT which relates to the students includes three columns which contain, respectively, the number which identifies the student STNUM which is a primary key, the name of the student NAME, and lastly the age of the student AGE. This table is translated into a class STUDENT which includes three attributes ATTRIBUTES which correspond to the columns in the translated table. A second table COURSE which relates to the courses also includes three columns which contain, respectively, the number identifying the course CSNUM which is a primary key, the title of the course TITLE and the number of hours spent on the course NB_HRS. This table is translated into a class COURSE which includes three attributes ATTRIBUTES which correspond to the columns of the translated table. A third table ATTEND which relates to the attendance of these courses by the students includes two columns which contain, respectively, the number which identifies the student ST NUM and the number which identifies the course CS NUM which are foreign keys FK which correspond to the primary keys with the same designation, this table typically being a joining table since it only contains foreign keys, each n-uplet representing a relational link between a student and a course. This table, therefore, is not translated into a class but into methods METHODS in the classes it labels, in the class STUDENT by a method Course() which returns a collection of courses Collection<Course>and in the class COURSE by a method Students() which returns a student collection Collection<Student>. Such a relational schema can be represented as follows using, for example, the language SQL as the language for defining and manipulating data:

```
CREATE TABLE STUDENT (
    ST_NUM  number (6) PRIMARY KEY,
    NAME    char (80),
    AGE     number (3));
CREATE TABLE COURSE (
    CS_NUM  number (6) PRIMARY KEY,
    TITLE   char (80),
    NB_HRS  number (3));
CREATE TABLE ATTEND (
    ST_NUM  number (6) REFERENCES STUDENT (ST_NUM),
    CS-NUM  number (6) REFERENCES COURSE (CS_NUM));
```

In addition, relative to the determination of the cardinality, the fact that no uniqueness constraint is defined for the attributes of the relation which are specific to the attendance of the courses ATTEND signifies that the cardinality of the relational link is in the order n-m, meaning that a student may attend several courses and that a course may be attended by several students. If, on the contrary, the attribute STNUM of the relation ATTEND was declared to be "unique," or a primary key, the cardinality of the relational link would be numbered 1-n, which indicates that a student can only attend one course, since it appears only once in the table ATTEND, whereas a course may be attended by several students. In this case, the method Course() of the class STUDENT generated not could return a collection of courses, but only one course.

FIG. 2 shows a part of the interface of the classes generated and implemented by the interface generation device GEN, this implementation authorizing genuine access to the data base management system RDBMS. Each class generated contains a set of common methods, some of which are applicable to the class, that is to the set of all the instances, whereas others are applicable to the objects, that is to the instances. For the generation of interfaces according to the invention, the class methods are represented, particularly in C++language, by static functions such as for example the creation methods or the search or query methods which make it possible to obtain an object if its key is known, or to obtain a set of objects using several simple selection criteria. The methods which are directly applicable to the objects are specific to deletion and update operations. An example of a class generated (using C++language) for the table STUDENT described above is given below:

```
class Student
{
private:
    int st_num;
    char* name;
    int age;
public:
    int st_num( );
    char* name( );//read attribute
    void name (char*);//write attribute
    int age ( );
    void age (int);
    Student (int key);//create and insert
    ~Student ( );//erase the object from memory
    destroy ( );//delete the object from memory and data in
        db
    static Student *get (int key);
    static Collection <Student> *query (char *where)
    Collection <Course> *attend_course( );//relationship
    void create_attend (Course*);//create relationship
    void delete attend (Course*);//delete relationship };
```

As just seen in this example, a set of operations for the manipulation of and access to data is provided and offered along with the object-oriented interface thus generated. Thus, in order to facilitate a better understanding of the operations carried out in this example, several details follow which relate to the methods used.

The creation method, which both creates an object and inserts the corresponding data into the data base (the key of the object and possibly the initialization parameters having been entered), according to the C++language used in the present example, is actually the constructor of the class generated. In the preceding example, the constructor, which is the method for creating class instances, has as a parameter the key of the student entity which is the number of the student:

Student (int key);

The destruction method deletes both an object and the corresponding entity in the data base, and it corresponds to the "destroy" method used in the preceding example:

destroy();//delete the object and data in db

~Student ();//erase the object from memory (and only from the memory)

The destructor "~Student" is principally used internally, but it is available to the programmer who wishes to manage the allocation or "deallocation" of the memory, knowing that the deletion of the object in the memory does not affect and therefore does not cancel a modification which could be carried out on the entity during a transaction, since the destructor deletes the object from the memory only.

Two query and search methods are generated for each class;

the method "get" returns an object whose key is known, while the method "query" returns a set of objects whose attributes meet certain simple criteria.

static Student *get (int key);

static Collection<Student>*query (char *where);

The updates are executed by means of methods associated with the attributes, namely the methods for reading and writing the attributes, the methods for writing the attributes propagating the modifications executed on these objects to the data base. In the current C++version, the programmer does not manipulate the attributes directly; associated methods must also be used. There is no method for updating the attributes which are specific to the keys since they identify the entity. The reading and updating methods for the attribute "age" are the following:

int age();//read void age (int);//write

Methods for navigating through relational links are also generated. In the class Student generated, there is thus a method for navigating through the relational link "attend" (first row), another for creating a relational link between the current "student" object and a "course" object (second row) and a third for deleting such a relationship (third row).

Collection<Course>*attendcourse();

void createattend (Course*);

void deleteattend (Course*);

Most of these methods encapsulate mechanisms in a language for defining and manipulating data such as SQL; the method "attendcourse", for example, is implemented by using the following SQL mechanisms:

SELECT C.* FROM COURSE C, ATTEND A WHERE A.STNUM =stnum (of the state of the object) AND A. CS NUM =C.CSNUM Likewise, a generic class "Collection" is used to manipulate sets of objects; it makes it possible to scan the set of instances of a class or the instances which correspond to certain selection criteria. This class, in fact, advantageously encapsulates the cursors of the data base management system RDBMS in such a way that the memorization of the data occurs in this system RDBMS and not at the object level. The objects are not created before a search operation of the "fetch" type has been requested. The collections often result from methods of the "query" or "navigation through the relational links" types.

```
template <classT> class Collection {
public:
    T* next( );
};
```

The management of transactions can also be explained with the aid of the same example, remembering that the essential principle of the present invention lies in the fact that the generation device GEN makes it possible to furnish object interfaces for access to existing data stored in a data base management system RDBMS and that the objects handled are only views of relational data. This means that the interface generated can advantageously be supported by the mechanisms of the data base management systems, such as the management of transactions or the cursors which are simply encapsulated by collections.

All the operations carried out on the objects are translated directly into corresponding relational operations, and the data in the buffers of the management system RDBMS are the reproduction of the state of the objects in the memory, these objects being only views of the state of the data base RDB. The actual update of the data base is obtained by means of "commit"and "abort" type commands (which respectively correspond to functions for the validation and cancellation of transactions), triggered from the application by means of a management class, called a data base administrator, created for managing transactions. Thus, for example, all the creation, deletion and modification operations are propagated directly to the data base management system but are only validated when a validation order of the "abort" type (or a "rollback" command used with the relational data base management system Oracle (registered trademark of Oracle Corporation)) is executed.

This aspect is illustrated particularly well in the following example, in which the method for updating the attribute AGE of the class STUDENT is implemented using an SQL command of the "UPDATE" type:

```
void age (int val) {
    ...
    sql ("UPDATE STUDENT SET AGE = val WHERE ST_NUM = this st_num;")
    ...
};
```

The object tables memorized are maintained in such a way as to avoid the relational entities' being loaded twice, a duplication which can generate inconsistencies. These tables are also used to clear the memory when a validation order of the "commit" type is given.

The "commit" type method of the "data base administrator"class created is implemented by a "commit" type order emitted by the management system RDBMS and a clearing of the memory. The interface of this "data base administrator" class is offered below:

```
class DBA {
    void commit ( );
    void abort ( );
    void connect (char* user_name, char* passwd);
    void disconnect ( );
};
```

The instant device for generating object-oriented interfaces can advantageously be used in a centralized environment or even in a distributed environment, and in the latter case it can be used in a advantageous way as a component for access to a data base which implements the process for generating object-oriented interfaces, on one hand to generate the interfaces, expressed in an interface description language, of the various classes, and on the other hand to generate a server from this component.

The instant device for generating object-oriented interfaces, as well as the instant process implemented by this device, can therefore be used with and integrated into CORBA (Common Object Request Broker Architecture), the architecture of which is specified and published by the OMG (Object Management Group) in the document "The Common Object Request Broker: Architecture and specification," OMG Document Number 93.12.43, December 1993.

In this context, the set of C++classes generated effectively constitutes an object-oriented component for access to a data base which can be used, in a client/server type mode, by various remote CORBA clients once the IDL interfaces in interface description language of the various classes have been generated and a CORBA server has been created as a set of classes from this component. For this purpose, the set of C++classes, that is the server, and the corresponding IDL interfaces are created simultaneously. These IDL interfaces are then compiled by the IDL compiler, which is furnished in this type of environment, and more precisely by the ORB (Object Request Broker), in order to obtain the "stubs" (as they are called by one skilled in the art) used by the client and the skeletons for constructing the server.

The usual method for constructing such a CORBA server is to define the IDL interfaces, to generate the skeletons by means of the IDL compiler, and then to complete these skeletons manually, that is by writing, in order to implement the objects which correspond to the skeletons generated. The approach according to the invention is completely different, since the implementation of the server already exists due to the fact that the interface generation device created the set of C++classes and that the corresponding IDL language was subsequently defined. Moreover, the IDL interfaces generated differ completely from C++headers, since the concepts of static and generic-type functions do not exist in the IDL language of CORBA. This means that for each C++class, for example for the class "Student" cited above, three IDL interfaces are generated, one to represent the class, which contains the static functions (class Student), one to represent an object with the non-static functions (Student), and one to represent the collections of objects in this class which are generally returned by the functions for navigating through the relational links or the "query" type functions (CollectionStudent). The skeletons of the server correspond to these IDL interfaces and are implemented simply by encapsulating calls to the classes generated by the interface generation device. The IDL interfaces generated by the device according to the invention which correspond to the class "Student" are the following:

```
interface Student {
    readonly attribute unsigned long st_num;
    attribute string <80> name;
    attribute unsigned long age;
    void remove ( );//correspond to the destructor
    void destroy ( );
    Collection_Course attend_course( );
    void create_attend (in Course);
    void delete_attend (in Course);
};
interface Class_Student {
    Student create (in unsigned long key); //constructor
    Student get (in unsigned long key);
    Collection_Student query (in string where);
};
interface Collection_Student {
    Student next ( );
};
```

Integration with the object transaction services can also be achieved, particularly with the CORBA OTS (Object Transaction Service). In fact, most data base management systems furnish adequate interfaces; for example the Oracle system furnishes the XA interface of the distributed transaction processing model (Distributed Transaction Processing Model of X/OPEN) and can be used by OTS as a resource manager.

In summary, the present invention makes it possible to combine the recognized advantages of relational data base management-related technology with the emerging object-oriented technology which is currently widely accepted, by simply and efficiently establishing the cooperation and even the integration of these two environments.

To conclude, the instant device for generating object-oriented interfaces which is claimed herein furnishes object-oriented access to any existing relational data base, making it possible to create, delete, read and update the data. A set of classes is generated from the relational schema in order to create an interface, thus facilitating access to the data. These classes can be used locally by any application or in a distributed environment as a server which a remote client can access through a network, particularly a CORBA client through the ORB.

As a result of the invention, a programmer developing an object-oriented application who wishes to use relational data bases benefits from the following advantages:

the phase for the conceptual translation of tables into objects is considerably simplified, usually, access to a relational data base using any programming language necessarily involves the cumbersome and tedious development of a code for managing the cursors, the correspondence of types and the variables. According to the invention, all of this is generated automatically with the implementation of the classes of the interface, the application programmer is not faced with problems which are specific to the logic of data access; he need only concentrate on the logic of the application. Nor does he encounter problems with data consistency during the memorization of the data (locks, duplication, etc.), the latter being automatically taken care of by the manager of memorized objects which is furnished with the device according to the invention, the application programmer only needs to know one model, the object model, and one language (not "embedded SQL" for example).

Since the generation process is automatic, the interface generation device according to the invention can be integrated into any CASE (Computer Aided Software Engineering) environment.

Another advantage inherent in the invention is that access to relational data bases can be gained without any need to make the data base migrate to a new data base management system or to modify the data base. Moreover, access to new object-oriented applications is authorized in concert with existing old applications, since the management of objects relies on transactional mechanisms of relational data base management systems.

This interface generation device can also be used during the design of new data bases. For applications in which relational storage is more appropriate, it is possible, first of all, to design the schema of the relational data base using a methodology based on the data, and secondly, to obtain the classes used to access and manipulate the data automatically. The dynamic part of the application can be designed by using an object-oriented methodology.

Likewise, in designing the device according to the invention, a decision was made not to develop an object-oriented request language of the SQL type, for the following reasons:

it would in that case have been necessary to integrate this language into the programming language, most of the complex query or search requests in relational applications, that is those which involve more than one table, are formulated for the purpose of navigating through joining tables; such requests are predefined in the relational links generated, moreover, the standards in this field have not been clearly established.

Instead, it was preferable to use simple functions which were well integrated with the classes generated.

Furthermore, with regard to the input of the interface generation device, it is possible to choose between two solutions. A first solution consists of considering the conceptual model of the data base, which is usually described using an entity-association model which represents the entities of the application together with the links which relate to the entities. A second solution, the one which was chosen, consists of using as input the same schema of the relational data base, generally represented by using the language for defining and manipulating data. The second solution was chosen for various reasons. A first reason is that there is no standard representation for a conceptual model (even an entity-association model) which could be used as input. Next, the conceptual model does not contain any information relative to physical storage, that is in which tables the data may be found, which is necessary in order to generate the access interface. Moreover, the introduction of referential integrity constraints in an SQL-type language offers a standard means for representing the associations in a relational schema. Finally, the SQL-type language for defining and manipulating data with referential integrity constraints such as foreign keys is a standard input description for a relational data base.

Lastly, the design of the device according to the invention advantageously makes it possible to achieve the following perspectives:

the capability to generate object-oriented interfaces from relational views, which would the creation of personalized interfaces for a determined client which could be directly adapted to the needs of the application. This has an obvious advantage when it comes to the generation of objects which implement access to a relational data base from the description of the correspondence between the data structures of such objects and an SQL-type request;

the developer of object-oriented applications may also be interested in storing new objects defined in the application in the relational data base management system; thus the interface generation device could also be used to furnish the opposite functionality, that is to generate relational storage from an object-oriented schema. This means that it would be necessary to generate the corresponding relational schema, and to implement the classes which make use of this relational schema, in order to accomplish this storage. In this case, the translation rules and the classes generated are similar to those defined and described previously, but could be slightly more complex since the object-oriented schema can contain additional concepts such as object inheritance;

in a given network, particularly in a given ORG, the CORBA server constructed from the classes created, which corresponds to the object-oriented interface, could be generated with the IDL definitions.

I claim:

1. A device for generating object-oriented interfaces for authorizing new applications developed in object-oriented environments to access existing relational data bases, said device comprising means for creating, in accordance with a process for generating object-oriented interfaces from a schema of the relational data bases, an object schema which constitutes an object-oriented view of the relational data bases, wherein the view, which constitutes the object-oriented interface, is composed of a set of classes which represent entities stored in the relational data base and of links between objects which represent relational links between said data bases, said links between objects being represented by methods, said device further including means for receiving input to the device in the form of a data base description in a standard language used for defining and manipulating data.

2. The device for generating object-oriented interfaces according to claim 1, further comprising means for managing objects in memory and manipulating the objects, means for creating a generic class called a collection class which enables scanning of a set of instances of a class, or instances which correspond to certain selection criteria, in order to allow rapid access to data, and which encapsulates mechanisms of a relational data base management system, such as cursors, in such a way that the data which relate to the objects in memory are managed by the data base management system.

3. The device for generating object-oriented interfaces according to claim 2, wherein the collection class includes two private attributes as well as two public methods, said two public methods including a first method for creating class instances and a second method for navigating the collection class, which second method enables retrieval, one by one, of the objects of the collection class, wherein the first method has as an input parameter a request, in a standard language for defining and manipulating data, which a user wishes to initiate, said first method being operable to execute the request and retrieve the identifier of the cursor containing n-tupels which meet a criteria of the request, wherein if the user desires to create the objects which correspond to the request, the second method is initiated for the collection class retrieved, and the objects are then created one by one.

4. The device for generating object-oriented interfaces according to claim 2, including a data base administrator class which authorizes management of transactions and which implements four methods for executing, respectively, functions validating a transaction, cancelling a transaction, connecting to the relational data base management system, and disconnecting from said relational data base management system, and means for creating, for each class which represents a relational table, a table which contains identifiers of the objects present in memory, an identifier of an object being a primary key which identifies a corresponding object in a relational world, and addresses of said objects, said table being updated by methods used to create or delete an object, while for each class, a table class which is specific to a name of the class is generated in order to implement these methods which execute functions of memory management and which contain descriptions of the table which lists the objects present in memory, such management enabling a same relational entity to be loaded into an object program only once.

5. The device for generating object-oriented interfaces according to claim 3, including a data base administrator class which authorizes management of transactions and which implements four methods for executing, respectively, functions validating a transaction, cancelling a transaction, connecting to the relational data base management system, and disconnecting from said relational data base management system, and means for creating, for each class which represents a relational table, a table which contains identifiers of the objects present in memory, an identifier of an object being a primary key which identifies a corresponding object in a relational world, and addresses of said objects, said table being updated by methods used to create or delete an object, while for each class, a table class which is specific to a name of the class is generated in order to implement these methods which execute functions of memory management and which contain descriptions of the table which lists the objects present in memory, such management enabling a same relational entity to be loaded into an object program only once.

6. A device for generating object-oriented interfaces according to claim 4, further including means for implementing three methods for executing functions of memory management, said three methods including a first management method which enables determining if an object corresponding in parameter to a past key is already present in memory, and if said past key is present, retrieving an address thereof, a second management method which enables listing said object as being present in memory, and a third management method which enables, in case of destruction of said object, deleting of the object from a list of objects present in memory.

7. A device for generating object-oriented interfaces according to claim 5, further including means for implementing three methods for executing functions of memory management, said three methods including a first management method which enables determining if an object corresponding in parameter to a past key is already present in memory, and if said past key is present, retrieving an address thereof, a second management method which enables listing said object as being present in memory, and a third management method which enables, in case of destruction of said object, deleting of the object from a list of objects present in memory.

8. A process for generating object-oriented interfaces implemented by an interface generation device, including the steps of creating an object schema from a relational schema by systematically translating relational tables into classes, and relational links between said tables expressed by means of foreign keys into links between objects represented by methods, generating, in a first lexical and syntactic analysis phase, a syntactic tree which describes the relational schema in a standard language for defining and manipulating data, navigating said tree a first time in order to label all joining tables, that is the tables which have only foreign keys for attributes, navigating the tree a second time to generate a class for each table which is not a joining table, generating linkage methods for each foreign key of such a table, and for each joining table which relates to said table, and further generating linkage methods which correspond to a class of said table.

9. The process of claim 8, further including the steps of utilizing the device for generating object-oriented interfaces as a component for access to a data base in a distributed environment, to generate the object-oriented interfaces, expressed in an interface description language, of the classes, and generating a server from the components.

* * * * *